J. G. REIFF.
Carriage.
No. 59,452. Patented Nov 6, 1866.
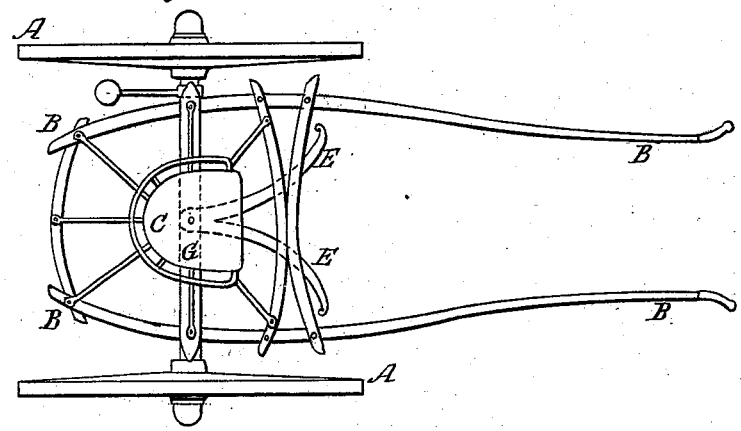
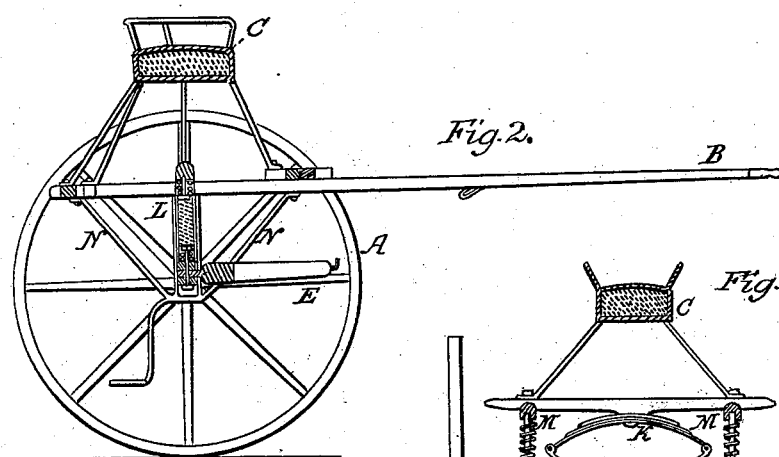
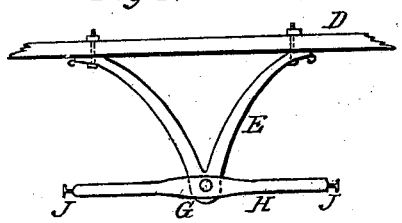
Witnesses.
Levy Dillenberg.
John Mattys.
Inventor.
Jacob G. Reiff
By his Atty.
J. Franklin Reigart.

UNITED STATES PATENT OFFICE.

JACOB G. REIFF, OF FARMERSVILLE, PENNSYLVANIA.

IMPROVEMENT IN SULKIES.

Specification forming part of Letters Patent No. 59,452, dated November 6, 1866.

*To all whom it may concern:*

Be it known that I, JACOB G. REIFF, of Farmersville, West Earl township, county of Lancaster and State of Pennsylvania, have invented new and useful Improvements in Sulkies; and I do hereby declare the following to be an exact description of the same, reference being had to the accompanying drawings and to the letters of reference marked thereon, making a part of this specification, in which—

Figure 1 represents a top view; Fig. 2, a longitudinal and vertical section; Fig. 3, a back view. Fig. 4 shows how the forked single-tree is intended to be reversed.

The nature of my invention consists in the arrangement and combination of the elliptic spring, side-sliding guides, spiral springs, stays, and forked single-tree with the shafts connected with the driver's seat, so as to ride always on a level.

A represents the sulky-wheels; B, the shafts; C, the driver's seat; D, the axle of wheels; E, the forked single-tree, that is reversible by being attached to the axle D at the forked ends or at the junction G, so that when the forked ends are in front the harness-traces may be hooked onto the front ends, or when the forked ends are attached to the axle a cross-piece, H, may be attached at the junction G by a screw-bolt and the traces then hitched to the hooks J. The elliptic spring K is constructed of steel plates one-eighth of an inch in thickness, and elasticity is gained and maintained by the use of these thin one-eighth-inch plates, multiplied and increased up to the required resisting power, that have a decided advantage over all other elliptic springs ever made for carriages or sulkies, as they have always been manufactured of plates one-quarter of an inch in thickness, and do not have or retain the same elasticity or springing power. L are guiding-slides attached to the shafts B (inclosing a spiral spring, M,) and operating on each side of the axle D, designed to overcome the jolting in traveling over rough and undulating roads, and always enabling the driver to sit square and level in his seat, so that when one wheel suddenly comes in contact with a stump or a stone the axle D rises in the guide and the guide slides down below the axle until the axle comes in contact with the lower end of the spiral spring, avoiding any jar or shock, while in other sulkies, when the wheel strikes an obstruction, the axle and driver's seat are raised on one side, that frequently upsets the driver, who is thrown out and injured. N are stay-rods bolted to the shafts B, and are attached to the lower ends of the sliding guides L, to brace the guides and prevent any lateral movement of the guides, and assisting in keeping the driver's seat level and firm.

What I claim as my invention, and desire to secure by Letters Patent, is—

The arrangement and construction of the elliptic spring K, side sliding guides L, spiral springs M, stays N, and forked reversible single-tree E, when combined and operating as herein described, and for the purposes set forth.

JACOB G. REIFF.

Witnesses:
J. FRANKLIN REIGART,
A. E. ROBERTS.